US012620831B2

(12) United States Patent
Chen et al.

(10) Patent No.: US 12,620,831 B2
(45) Date of Patent: *May 5, 2026

(54) DUAL POWER SUPPLY TRANSFER SWITCH BASED ON SOLID-STATE SWITCH

(71) Applicant: Schneider Electric Industries SAS, Rueil Malmaison (FR)

(72) Inventors: Xiaohang Chen, Shanghai (CN); Haijun Zhao, Shanghai (CN); Ying Shi, Shanghai (CN); Jiamin Chen, Shanghai (CN); Yangfeng Song, Shanghai (CN); Qing Yang, Shanghai (CN); Jihua Dong, Shanghai (CN); Kunpeng Zhang, Shanghai (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/565,634

(22) PCT Filed: Jun. 30, 2023

(86) PCT No.: PCT/CN2023/105027
§ 371 (c)(1),
(2) Date: Nov. 30, 2023

(87) PCT Pub. No.: WO2024/002358
PCT Pub. Date: Jan. 4, 2024

(65) Prior Publication Data
US 2025/0149914 A1      May 8, 2025

(30) Foreign Application Priority Data
Jun. 30, 2022     (CN) .......................... 202210770934.8

(51) Int. Cl.
*H02J 9/06*          (2006.01)

(52) U.S. Cl.
CPC ............... *H02J 9/068* (2020.01); *H02J 9/062* (2013.01)

(58) Field of Classification Search
CPC .............................. H02J 9/04–08; H02J 3/007
See application file for complete search history.

(56) References Cited

U.S. PATENT DOCUMENTS 3,526,778 A * 9/1970 Crocker .................. H02J 9/066
318/717
11,211,816 B1    12/2021 Bose et al.
(Continued)

FOREIGN PATENT DOCUMENTS

CN          1592031 A      3/2005
CN        101604857 A     12/2009
(Continued)

OTHER PUBLICATIONS

English machine translation of CN105024450A published Nov. 4, 2015 (Year: 2015).*
(Continued)

*Primary Examiner* — Daniel Cavallari
*Assistant Examiner* — David A Shiao
(74) *Attorney, Agent, or Firm* — Kinney & Lange, P.A.

(57) ABSTRACT

A dual power supply transfer switch (SSATS) for switching between a first power supply (S1) and a second power supply (S2) to supply power to a load is provided, includes: a solid-state switch (SS); a mechanical switch (CTR); and a compensation power module (AUX). In the case that the S1 fails in supplying power to the load, the AUX uses the S2 to supply power to the load, and the output current of the S1 is reduced. After satisfying the turn off condition for the SS, the SS turns off the S1, the CTR turns off the S1 and turns on the S2. After the S2 is adjusted to synchronize with the phase of the output current of the S1, the SS turns on the S2
(Continued)

and the AUX stops outputting current. The SSATS provides advantages such as fast transfer, zero interruption, and short voltage sag time.

18 Claims, 6 Drawing Sheets

(56)                References Cited

U.S. PATENT DOCUMENTS

| | | | | |
|---|---|---|---|---|
| 2003/0048004 A1* | 3/2003 | Fleming | .................... | H02J 9/06 |
| | | | | 307/64 |
| 2003/0048005 A1* | 3/2003 | Goldin | .................... | H02J 3/007 |
| | | | | 307/64 |
| 2006/0226706 A1* | 10/2006 | Edelen | .................... | H02J 9/062 |
| | | | | 307/64 |
| 2009/0072623 A1* | 3/2009 | Liao | ........................ | H02J 9/061 |
| | | | | 307/65 |
| 2013/0106190 A1* | 5/2013 | Lin | ......................... | H02J 9/061 |
| | | | | 307/64 |
| 2017/0317525 A1* | 11/2017 | Navarro | ................... | H02J 9/062 |
| 2018/0131181 A1 | 5/2018 | Compton | | |
| 2020/0014239 A1* | 1/2020 | Liu | ......................... | H02M 1/08 |
| 2021/0249898 A1 | 8/2021 | Schecter et al. | | |
| 2021/0305840 A1 | 9/2021 | Wu et al. | | |
| 2023/0155368 A1* | 5/2023 | Du | ......................... | H02J 3/007 |
| | | | | 361/78 |

FOREIGN PATENT DOCUMENTS

| | | | | | |
|---|---|---|---|---|---|
| CN | 1881743 | B | | 5/2010 | |
| CN | 202840667 | U | | 3/2013 | |
| CN | 203522316 | U | | 4/2014 | |
| CN | 104539042 | A | | 4/2015 | |
| CN | 204349572 | U | | 5/2015 | |
| CN | 105024450 | A | | 11/2015 | |
| CN | 106410951 | A | * | 2/2017 | .............. H02J 9/061 |
| CN | 107508457 | A | | 12/2017 | |
| CN | 108808834 | A | | 11/2018 | |
| CN | 109412259 | A | | 3/2019 | |
| CN | 109461609 | A | | 3/2019 | |
| CN | 109672321 | A | | 4/2019 | |
| CN | 105024450 | B | | 11/2019 | |
| CN | 110601351 | A | * | 12/2019 | .............. H02J 9/062 |
| CN | 209844635 | U | | 12/2019 | |
| CN | 111009956 | A | | 4/2020 | |
| CN | 111082425 | A | | 4/2020 | |
| CN | 111146859 | A | | 5/2020 | |
| CN | 113644647 | A | | 11/2021 | |
| CN | 214626494 | U | | 11/2021 | |
| CN | 216016528 | U | | 3/2022 | |
| CN | 114430196 | A | | 5/2022 | |
| CN | 114513042 | A | | 5/2022 | |
| JP | 2009195086 | A | | 8/2009 | |
| JP | 2012120407 | A | | 6/2012 | |
| WO | 2018113704 | A1 | | 6/2018 | |
| WO | 2021197607 | A1 | | 10/2021 | |

OTHER PUBLICATIONS

English machine translation of CN110601351A published Dec. 20, 2019 (Year: 2019).*
English machine translation of CN111082425A published Apr. 28, 2020 (Year: 2020).*
International Search Report and Written Opinion mailed Sep. 22, 2023 in PCT/CN2023/105027, 8 pages.
International Search Report and Written Opinion dated Sep. 13, 2023 for International Patent Application No. PCT/CN2023/103254, 12 pages.
International Search Report and Written Opinion dated Sep. 14, 2023 for International Patent Application No. PCT/CN2023/103932, 12 pages.
International Search Report and Written Opinion dated Sep. 27, 2023 for International Patent Application No. PCT/CN2023/104605, 12 pages.
International Search Report and Written Opinion dated Oct. 13, 2023 for International Patent Application No. PCT/CN2023/103903, 13 pages.
Non-Final Office Action dated Dec. 18, 2024 from U.S. Appl. No. 18/563,303, 12 pages.
Extended European Search Report dated Feb. 13, 2025 for European Patent Application No. 23809940.2, 8 pages.
Extended European Search Report dated Mar. 17, 2025 for European Patent Application No. 23806158.4, 9 pages.
Extended European Search Report dated May 13, 2025 for European Patent Application No. 23806161.8, 7 pages.
Extended European Search Report dated May 16, 2025 for European Patent Application No. 23809075.7, 9 pages.

* cited by examiner

Simulation Result: ≈3ms Voltage sag, 0ms load interruption

DUAL POWER SUPPLY TRANSFER SWITCH BASED ON SOLID-STATE SWITCH

CROSS REFERENCE TO RELATED APPLICATIONS

The present application is a 35 U.S.C. § 371 National Phase Application of International PCT Patent Application No. PCT/CN2023/105027, filed Jun. 30, 2023, which claims the benefit of priority of Chinese Patent Application No. CN 202210770934.8, filed on Jun. 30, 2022. The entire contents of these applications are incorporated herein by reference in their entirety.

TECHNICAL FIELD

The present disclosure relates to a dual power supply transfer, and more specifically, to a dual power supply transfer switch based on a solid-state switch.

BACKGROUND

At present, the dual power supply transfer scheme with uninterrupted load is an automatic transfer switch (ATS) and uninterruptible power supply (UPS) architecture. The ATS is a simple mechanical structure, subject to inherent drawbacks of the mechanical structure. And the traditional ATS switching time is often greater than 100 ms, which is often unacceptable for some devices sensitive to power-down time. Therefore, for such loads, (The) ATS cannot independently complete power supply switching and often needs to cooperate with the UPS to meet the demand for supplying power to the load uninterruptedly. Specifically, the ATS is connected to two power supplies to switch between them, and when it is switching, supplying power to the load during the short-time switching power-down process is maintained by cooperating with the UPS.

SUMMARY

Technical Problem

Based on the ATS and UPS architecture, continuous supplying power to the load side can be implemented, but there are the following drawbacks. Since the ATS switching process results in a power-down on the UPS input side, and the power-down duration may be up to 500 ms. In addition, the ATS uses mechanical switch (CTR) to switch power supply output, so when the power supply is switching, the CTR may experience arcing phenomenon. In addition, the ATS and UPS architectures cannot track a phase difference between the two power supplies.

On the other hand, maintaining supplying power to the load side requires an internal battery pack of the UPS. For loads above 100 A, a larger battery pack is required. At the same time, in order to maintain the continuity of supplying power to the load, the modules of the UPS must be online for a long period of time, which results in a relatively low power transfer efficiency.

Solution to Problem

According to one aspect of the present disclosure, a dual power supply transfer switch (SSATS) for switching between a first power supply (S1) and a second power supply (S2) to supply power to a load is provided, including: a solid-state switch (SS), through which the S1 or the S2 is connected to the load; and a compensation power supply module (AUX), through which the S1 or the S2 is connected to the load. The S2 is used to supply power to the load through the compensation power supply module in the case that the S1 fails in supplying power to the load. The S1 is turned off from the power supply side through the SS in a case where an output current or output voltage of the AUX satisfies a first condition, and in a case where a phase of the AUX satisfies the second condition, the S2 is used to supply power to the load through the SS, and the AUX stops supplying power to the load.

In some embodiments, the SS includes: a first SS, which is connected to the S1 for connecting the S1 switch to the load; and a second SS, which is connected to the S2 for connecting the S2 switch to the load.

In some embodiments, the SS is a single SS.

In some embodiments, the SSATS includes: a first mechanical switch (CTR1), wherein the S1 is connected to the load through the CTR1 and the first SS; a second mechanical switch (CTR2), wherein the S2 is connected to the load through the CTR2 and the second SS. The CTR1 is turned off and the CTR2 is turned on, after the S1 is turned off from the power supply side through the SS.

In some embodiments, the SSATS includes a fifth mechanical switch (CTR1/2), configured as a single-pole, double-throw switch and through which the S1 or the S2 is connected to a load. The S2 is connected to the load through the CTR1/2, after the S1 is turned off from the power supply side through the SS.

In some embodiments, the SS includes a bidirectional switch array, wherein the bidirectional switch array is formed through a thyristor, an insulated gate bipolar transistor (IGBT) or a metal oxide semiconductor field effect transistor (MOSFET).

In some embodiments, the bidirectional switch array includes a thyristor in reverse parallel, or a MOSFET or IGBT transistor in reverse series.

In some embodiments, the AUX includes an AC-DC converter (AC/DC) and a three-phase inverter unit (VSI) in series.

In some embodiments, the AC/DC includes: a first AC/DC connected between the S1 and the VSI; and a second AC/DC connected between the S2 and the VSI, wherein, the first AC/DC and the second AC/DC are connected in parallel to the VSI.

In some embodiments, the AUX includes: a third mechanical switch (CTR3) connected between the S1 and the AC/DC; and a fourth mechanical switch (CTR4) connected between the S2 and the AC/DC, wherein, upon the S1 supplying power to the load, the CTR3 is turned off and the CTR4 is turned on, and upon the S2 supplying power to the load, the CTR3 is turned on, and the CTR4 is turned off.

In some embodiments, the AUX includes a sixth mechanical switch (CTR3/4) configured as a single-pole double-throw switch connected to the S1 and the S2, wherein, upon the S1 supplying power to the load, the S2 is connected to the AC/DC through the CTR3/4, and upon the S2 supplying power to the load, the S1 is connected to the AC/DC through the CTR3/4.

In some embodiments, the AC/DC includes a high-frequency transformer.

In some embodiments, the AC/DC includes a power frequency transformer.

In some embodiments, the first condition is that the output current of the AUX reaches a first threshold.

In some embodiments, the first condition is that the output voltage of the AUX reaches a second threshold.

In some embodiments, the second condition is that the phase of the AUX is synchronized with the phase of the S2.

Advantageous Effects of Invention

Compared to the existing ATS and UPS architectures, the SSATS of the present disclosure may provide advantages such as fast transfer, zero interruption, and short voltage sag time, etc. through the use of SS and AUX, and is not subject to the effects of an ATS arcing, and may also track the phase of the failure power supply during the transfer process. In addition, compared to the UPS, the SS has lower losses, eliminates the need for periodic battery replacement, and the configuration of the SS and power supply unit (PSU) may avoid the effect of switch arcing.

BRIEF DESCRIPTION OF DRAWINGS

The above and other aspects, features, and advantages of the specific embodiments disclosed herein will become more apparent from the following description combined with the accompanying drawings, and in which.

DETAILED DESCRIPTION

Before undertaking the detailed description below, it may be advantageous to set forth definitions of certain words and phrases used throughout this application document. The terms "include" and "comprise," as well as derivatives thereof, mean inclusion without limitation. The term "or" is inclusive, meaning and/or. The phrase "associated with," as well as derivatives thereof, means include, be included within, interconnect with, comprise, be comprised within, connect to or with, couple to or with, communicate with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any one of the following combinations: A, B, C, A and B, A and C, B and C, and A and B and C.

Definitions for other specific words and phrases are provided throughout this application document. Those of ordinary skill in the art should understand that in many if not most cases, such definitions apply to prior as well as future uses of such defined words and phrases.

In this application document, the application combinations of transform blocks and the hierarchy division of sub-transform blocks are used for illustrative purposes only, and the combinations of applications of transform blocks and the hierarchy of divisions of sub-transform blocks may be characterized in different ways without departing from the scope of the present disclosure.

FIG. 1 through FIG. 14, discussed below, and the various embodiments used to describe the principles of the present disclosure in this application document are for illustration purposes only and should not be construed in any way to limit the scope of the present disclosure. Those skilled in the art will appreciate that the principles of the present disclosure may be implemented in any suitably arranged system or device.

Figures 1, 2:
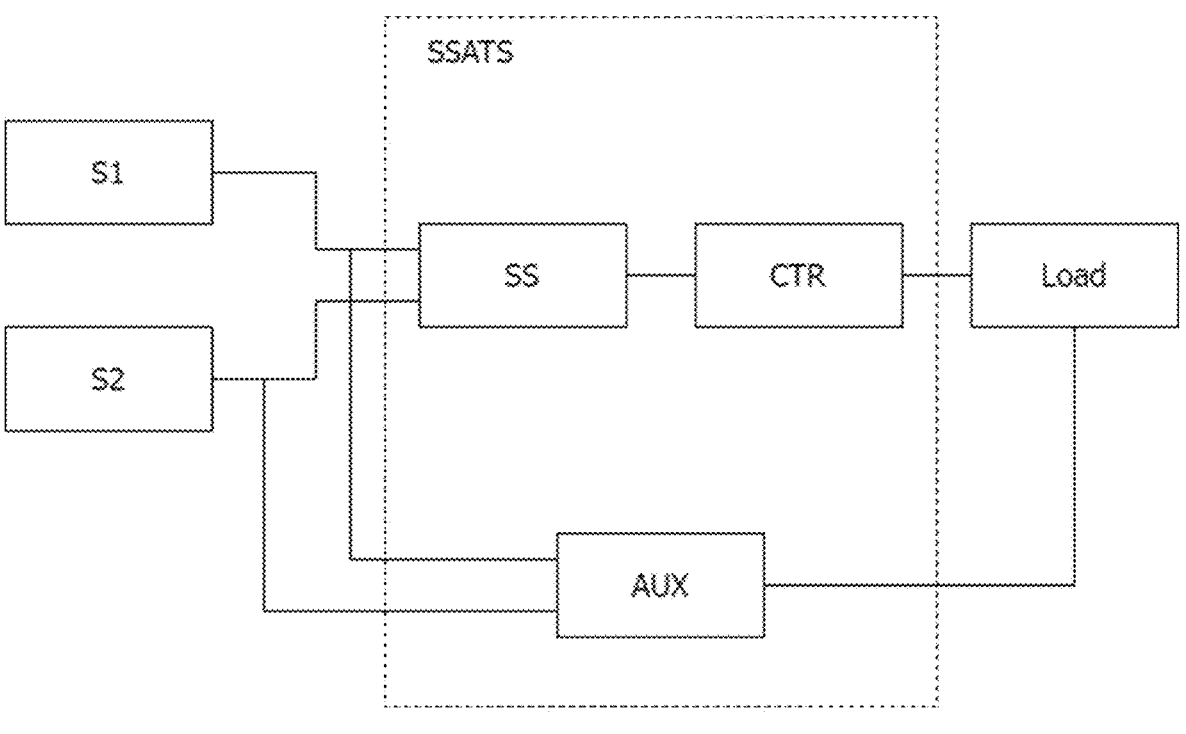
FIG. 1 is a schematic diagram of a SSATS according to embodiments of the present disclosure.
FIG. 2 is a schematic diagram of a detailed structure of a SSATS according to embodiments of the present disclosure.

FIG. 1 is a schematic diagram of a SSATS according to embodiments of the present disclosure.

As shown in FIG. 1, the SSATS includes a SS, a CTR, and a AUX. The SS is used to switch the S1 and the S2 to supply power to the load, and may include one or more SSes composed of semiconductor switches, such as SCR. The CTR physically isolates the S1 and the S2, and may be one or more CTRs that are separate or integral, independently controlled or interlocked. In addition, the positions of the SS and the CTR may be changed, and the same effect may be achieved by performing the same operating steps. The compensation power supply module includes an AC/DC and an inverter, where the AC/DC converts the three-phase current and voltage of the S1 or the S2 into DC current and voltage, and the inverter converts DC current and voltage into a three-phase current and voltage that have been phase adjusted.

The S1 and the S2 are connected to the load through the SS and the CTR, respectively. In addition, the S1 and the S2 are also connected to the load through the AUX, respectively. In the normal operating state of the S1 supplying power to the load, the SS and the CTR turn on the S1 and the load, and turn off the S2 and the load. The AUX turns on the S2 and turns off S1. In this situation, the S1 supplies power to the load as the main power supply, and the S2 serves as the backup power supply.

When the S1 fails (such as overvoltage, undervoltage, power-down, frequency overrun, overload, etc.), the AUX uses the S2 to supply power to the load, and the output current of the AUX is adjusted until the first condition is satisfied. The phase of the AUX is controlled to be synchronized with the phase of the S1. The first condition may be that the output current of the AUX reaches the first threshold, or the output voltage of the AUX reaches the second threshold. In this situation, the SS turns off the S1. Because the SS is a contactless switch, there is no arcing phenomenon caused by the voltage between the contacts breaking through the air layer during turning on and turning off.

Then, the CTR turns off the S1, and subsequently, if the phase of the S1 (i.e., the current phase of the AUX) and the phase of the S2 are not synchronized, the phase of the AUX is adjusted to be synchronized with the phase of the S2. When the phase of the AUX satisfies the second condition, the CTR and the SS turn on the S2, so that the S2 directly supplies power to the load through the SS and the CTR, and the AUX stops using the S2 to supply power to the load. The second condition may be that the phase of the AUX is synchronized with the phase of the S2. In addition, the AUX turns on the S1 and turns off the S2. In this situation, the S2 continues to supply power to the load as the main power supply, and the S1 serves as the backup power supply.

In other embodiments, the CTR and its operation may be omitted, and only the S1 and the S2 are switched by the SS without physically isolating the S1 and the S2.

FIG. 2 is a schematic diagram of a detailed structure of a SSATS according to embodiments of the present disclosure. The SSATS in FIG. 2 corresponds to the SSATS in FIG. 1.

As shown in FIG. 2, the SSATS includes a first SCR (SCR1) and a second SCR (SCR2), a CTR1 to a CTR4, a PSU, and a control unit (CNTR). The PSU includes an AC/DC and a VSI. The SCR1 and the SCR2 correspond to the SS in FIG. 1, the CTR1 and the CTR2 correspond to the CTR in FIG. 1, the CTR3, the CTR4, and the PSU correspond to the AUX in FIG. 1. The CTR1 and the CTR2 provide isolation between the S1 and the S2, and the CTR3 and the CTR4 also provide isolation between the S1 and the S2. The CNTR may be any component that performs the functions described below, such as a circuit, processor, etc.

The S1 is connected to the load through the SCR1 and the CTR1, and the S2 is connected to the load through the SCR2 and the CTR2. In addition, the S1 is also connected to the load through the CTR3 and the PSU, and the S2 is also connected to the load through the CTR4 and the PSU. In the normal operating state in which the S1 supplies power to the load, the SCR1, the CTR1, and the CTR4 are in a turning on state, the SCR2, the CTR2, and the CTR3 are in a turning off state, and the CNTR continuously detects the state of the S1. In this situation, the S1 supplies power to the load as the main power supply, and the S2 serves as the backup power supply.

When the CNTR detects a failure of the S1, the drive of the bridge arm of the SCR1 is turned off, and the CNTR tracks the phase of the S1, so as to control the PSU to use the S2 to output the three-phase current and voltage required for load. The AC/DC converts the three-phase current and voltage of the S2 into DC current and voltage, and the VSI converts DC current and voltage into a three-phase current and voltage synchronized with the phase of the S1. In this situation, the S1 and the PSU using the S2 simultaneously supply power to the load.

The CNTR controls the PSU to gradually increase the three-phase current and voltage, while the current passing through the SCR1 decreases until the output current of the PSU reaches the first threshold or the output voltage of the PSU reaches the second threshold. The first threshold may be the current required for the load (i.e., the current output by the S1 before the failure), such that the SCR1 turns off at zero-crossing due to the current dropping to zero. Those skilled in the art will appreciate that the first threshold may be other value that is set to be greater or less than the current required for the load as desired, and the first threshold may be used as a triggering condition to turn off the SCR1 in other ways. Similarly, the second threshold may be the voltage required for the load, or other value that is set to be greater or less than the voltage required for the load as desired, and the second threshold may be used as a triggering condition to turn off the SCR1 in other ways.

When the SCR1 is turned off, the CNTR may control the CTR1 to turn off and the CTR2 to turn on. Moreover, since the SCR1 is turned off, the possible arcing phenomenon generated by the CTR1 does not affect the load. In addition, the CNTR detects whether the phase of the S1 (i.e. the current phase of the PSU) is synchronized with the phase of the S2. If it is not synchronized, the CNTR controls the PSU to adjust the phase until the phase of the PSU is synchronized with the phase of the S2.

When the phase of the PSU is synchronized with the phase of the S2, the CNTR controls the SCR2 to turn on and the PSU to stop outputting, so that the S2 directly supplies power to the load through the SS and the CTR. In addition, the CNTR controls the CTR4 to turn off and the CTR3 to turn on, so as to turn on the S1 and turn off the S2. In this way, the S2 continues to supply power to the load as the main power supply, and the S1 is served as the backup power supply.

Figure 3:
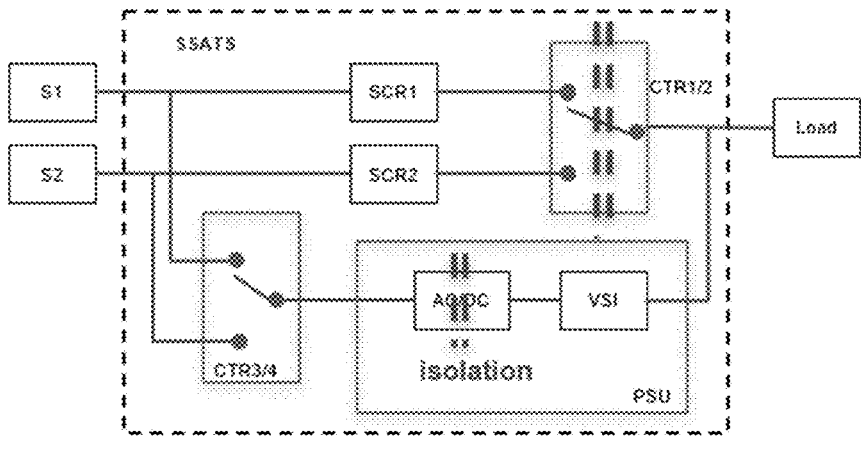
FIGS. 3 to 6 are schematic diagrams of detailed structures of other SSATSes according to embodiments of the present disclosure.

FIG. 3 is a schematic diagram of a detailed structure of other SSATSes according to embodiments of the present disclosure. The SSATS in FIG. 3 corresponds to the SSATS in FIG. 2.

In the SSATS shown in FIG. 3, the CTR1 and the CTR2 are replaced with a CTR1/2, and the CTR1/2 is a single-pole, double-throw switch. That is, for the CTR1/2, turning on the S1 is equivalent to turning off the S2, and turning off the S1 is equivalent to turning on the S2. Similarly, the CTR3 and the CTR4 are replaced with the CTR3/4, and the CTR3/4 is a single-pole double-throw switch. That is to say, for the CTR3/4, turning on the S1 is equivalent to turning off the S2, and turning off the S1 is equivalent to turning on the S2.

Figure 4:
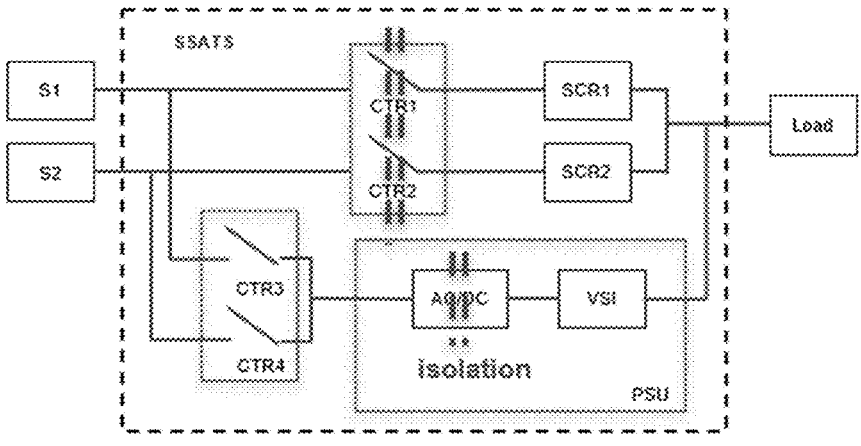

FIG. 4 is a schematic diagram of a detailed structure of other SSATSes according to embodiments of the present disclosure. The SSATS in FIG. 4 corresponds to the SSATS in FIG. 2.

In the SSATS shown in FIG. 4, compared to the SSATS in FIG. 2, the positions of the CTR1 and the CTR2 are switched with the positions of the SCR1 and the SCR2, and the same function can still be realized.

Figure 5:
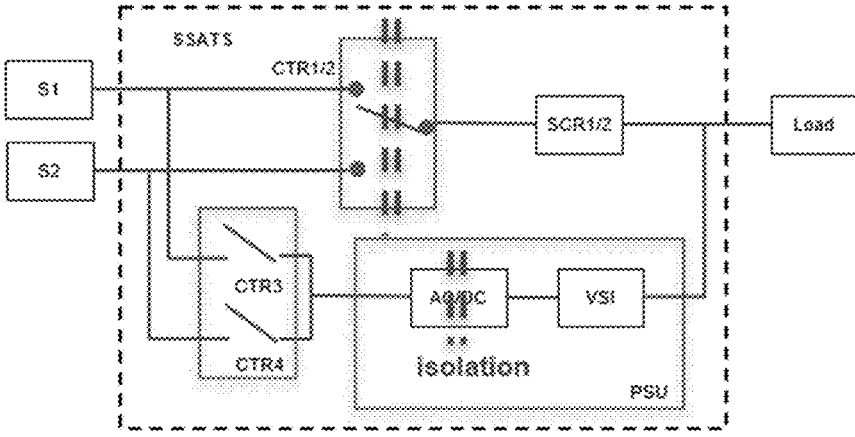

FIG. 5 is a schematic diagram of a detailed structure of other SSATSes according to embodiments of the present disclosure. The SSATS in FIG. 5 corresponds to the SSATS in FIG. 2.

In the SSATS shown in FIG. 5, the SCR1 and SCR2 are replaced with a single SCR SCR1/2. Compared to the implementation shown in FIG. 2, turning off the single SCR SCR1/2 is equivalent to turning off the SCR1, and turning on the single SCR SCR1/2 is equivalent to turning on the SCR2.

Figure 6:
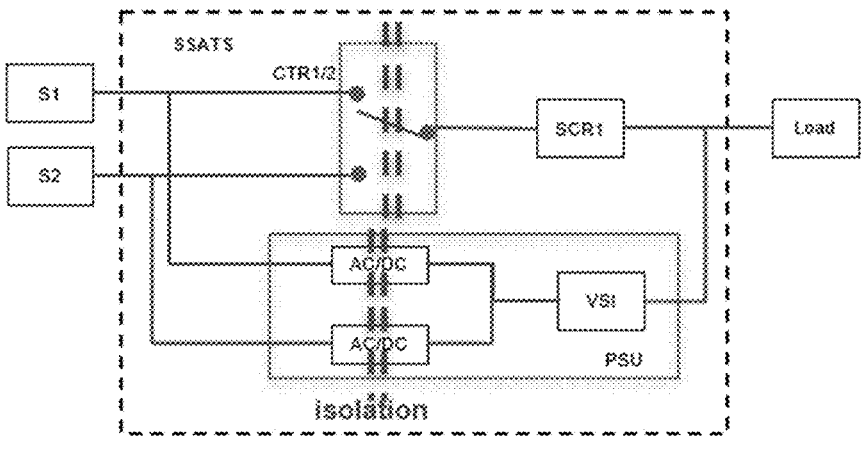

FIG. 6 is a schematic diagram of a detailed structure of other SSATSes according to embodiments of the present disclosure. The SSATS in FIG. 6 corresponds to the SSATS in FIG. 2.

In the SSATS shown in FIG. 6, the CTR3, the CTR4, and the AC/DC are replaced with the first AC/DC connected to the S1 and the second AC/DC connected to the S2, and the first AC/DC and the second AC/DC are also connected in parallel to the VSI. Therefore, the operations of the CTR3 and the CTR4 may be omitted, while maintaining isolation between the S1 and the S2.

Figure 7:
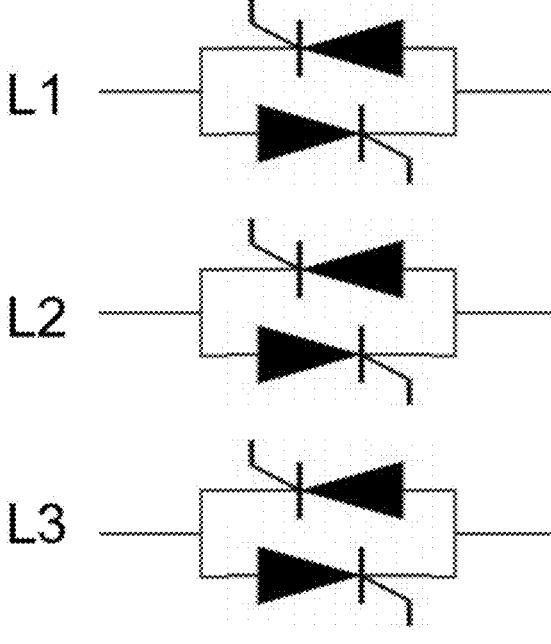
FIG. 7 is a schematic diagram of a detailed structure of a thyristor/Silicon Controlled Rectifier (SCR) according to embodiments of the present disclosure.

FIG. 7 is a schematic diagram of a detailed structure of a thyristor/Silicon Controlled Rectifier (SCR) according to embodiments of the present disclosure. The SCR in FIG. 7 corresponds to the SCR1 and SCR2 in FIG. 2.

In the SCR shown in FIG. 7, the SCR includes a bidirectional switch array corresponding to a three-phase power supply without neutral line, however, the present disclosure is not limited to thereto, and the SCR may correspond to other types of power supplies and employ a structure for other types of power supplies, in order to achieve a function similar to that of the SCR shown in FIG. 7. The bidirectional switch array has three bridge arms, each with two unidirectional SCRs in reverse parallel. With this configuration, positive or negative current can activate the gate of either of the two unidirectional SCRs, allowing AC current to pass through. When the current passing through either of the unidirectional SCRs falls below a threshold, the unidirectional SCRs cause the entire SCR to turn off, so as to enable bidirectional switch control. External circuits or components (such as the CNTR) may transmit control signals to the unidirectional SCRs to turn on the unidirectional SCRs. Those skilled in the art will understand the specific structure and related details of the unidirectional SCRs, therefore the description will be omitted in the present disclosure.

Figure 8:
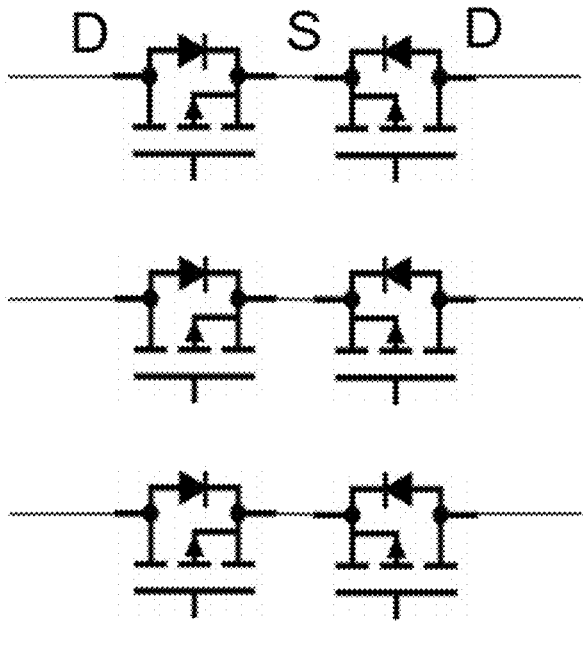
FIGS. 8 and 9 are schematic diagrams of detailed structures of other SCRs according to embodiments of the present disclosure.
Figure 9:
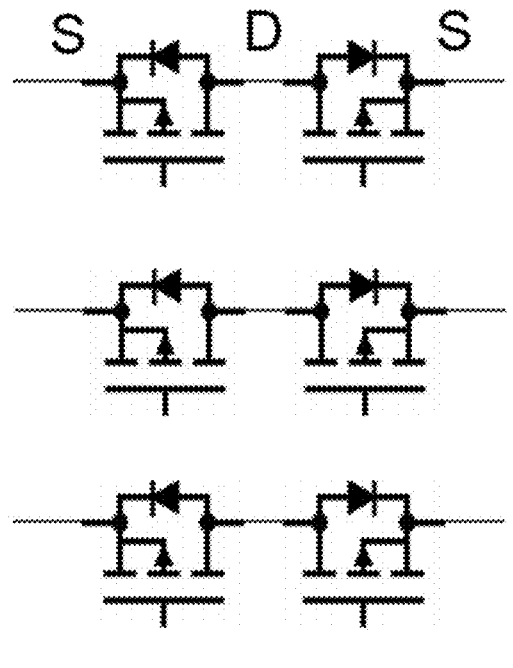

FIGS. 8 and 9 are schematic diagrams of detailed structures of other SCRs according to embodiments of the present disclosure. The SCR in FIGS. 8 and 9 corresponds to the SCR1 and SCR2 in FIG. 2, respectively.

In the SCRs shown in FIGS. 8 and 9, the SCRs include a bidirectional switch array corresponding to the three-phase power supply without neutral line, however, the present disclosure is not limited thereto, and the SCRs may correspond to other types of power supplies and employ a structure for other types of power supplies in order to achieve similar functions as the SCRs shown in FIGS. 8 and 9. The bidirectional switch array has three bridge arms, each with two positive channel metal oxide semiconductor (PMOS) transistors in reverse series, such as IGBT or MOSFET. FIGS. 8 and 9 illustrate two specific implementations of reverse series, respectively. With this configuration, the voltage drop of the diode may be avoided and reverse polarity protection may be provided. External circuits or components (such as the CNTR) may transmit control signals to the PMOS transistors to turn on the PMOS transistors. Those skilled in the art will understand the specific structure and related details of the PMOS transistors (such as IGBT or MOSFET), therefore the description will be omitted in the present disclosure.

Figure 10:
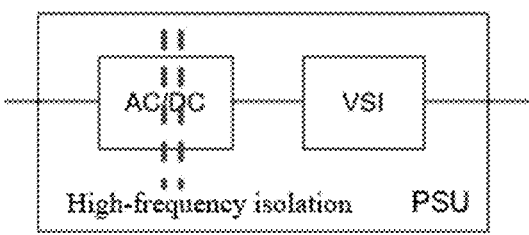
FIG. 10 is a schematic diagram of a detailed structure of a PSU according to embodiments of the present disclosure.

FIG. 10 is a schematic diagram of a detailed structure of a PSU according to embodiments of the present disclosure. The PSU in FIG. 10 corresponds to the PSU in FIG. 6.

In the detailed structure of the PSU shown in FIG. 10, the first AC/DC and the second AC/DC are replaced with high-frequency transformers so as to directly provide isolation between the S1 and the S2, and also convert the three-phase current and voltage into DC current and voltage to output to the VSI.

Figure 11:
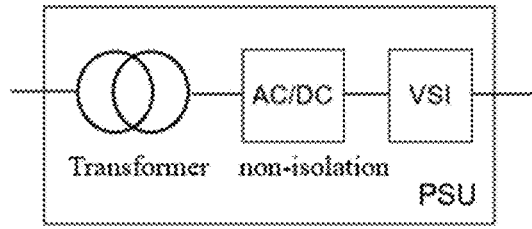
FIGS. 11 and 12 are schematic diagrams of detailed structures of other PSUs according to embodiments of the present disclosure.
Figure 12:
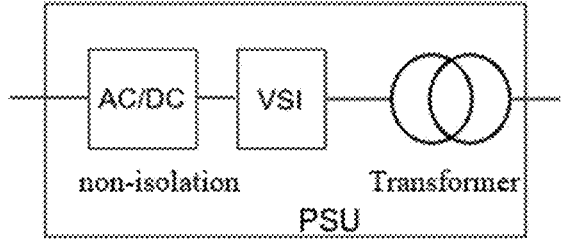

FIGS. 11 and 12 are schematic diagrams of detailed structures of other PSUs according to embodiments of the present disclosure. The PSUs in FIGS. 11 and 12 correspond to the PSU in FIG. 6.

In the detailed structure of the other PSU shown in FIG. 11, the first AC/DC and the second AC/DC are replaced with a power frequency transformer and an AC/DC, and the power frequency transformer, the AC/DC, and the VSI are connected in series. The power frequency transformer first receives uninsulated three-phase voltage and current output from the S1 or the S2, and performs adjustments (for example, when there is a voltage fluctuation in the S1 due to a failure, the power frequency transformer adjusts the uninsulated three-phase voltage to a stable level three-phase voltage), and then outputs the adjusted three-phase voltage and current to the AC/DC. The AC/DC converts three-phase voltage and current into DC current and voltage, and the VSI converts DC current and voltage into a three-phase voltage and three-phase current required by the load to provide it to the load.

In the detailed structure of the other PSU shown in FIG. 12, the first AC/DC and the second AC/DC are replaced with an AC/DC, and a power frequency transformer provided between the VSI and the load, and the AC/DC, the VSI, and the power frequency transformer are connected in series. The AC/DC converts the uninsulated three-phase current and voltage output by the S1 or the S2 into DC current and voltage, and the VSI converts DC current and voltage into a three-phase current and an unexpected three-phase voltage required by the load. Then, the power frequency transformer adjusts the unexpected three-phase voltage to provide the three-phase current and voltage required by the load to the load.

Figure 13:
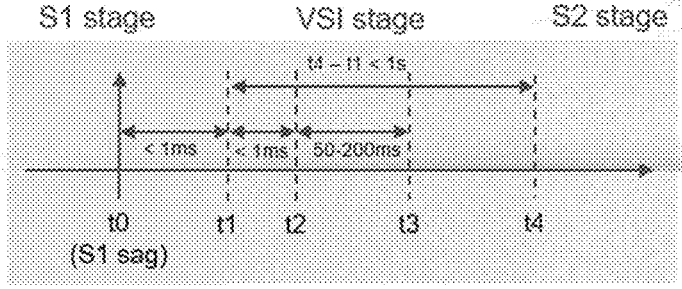
FIG. 13 is a schematic diagram of timing of the simulation of a SSATS according to embodiments of the present disclosure.
Figure 14:
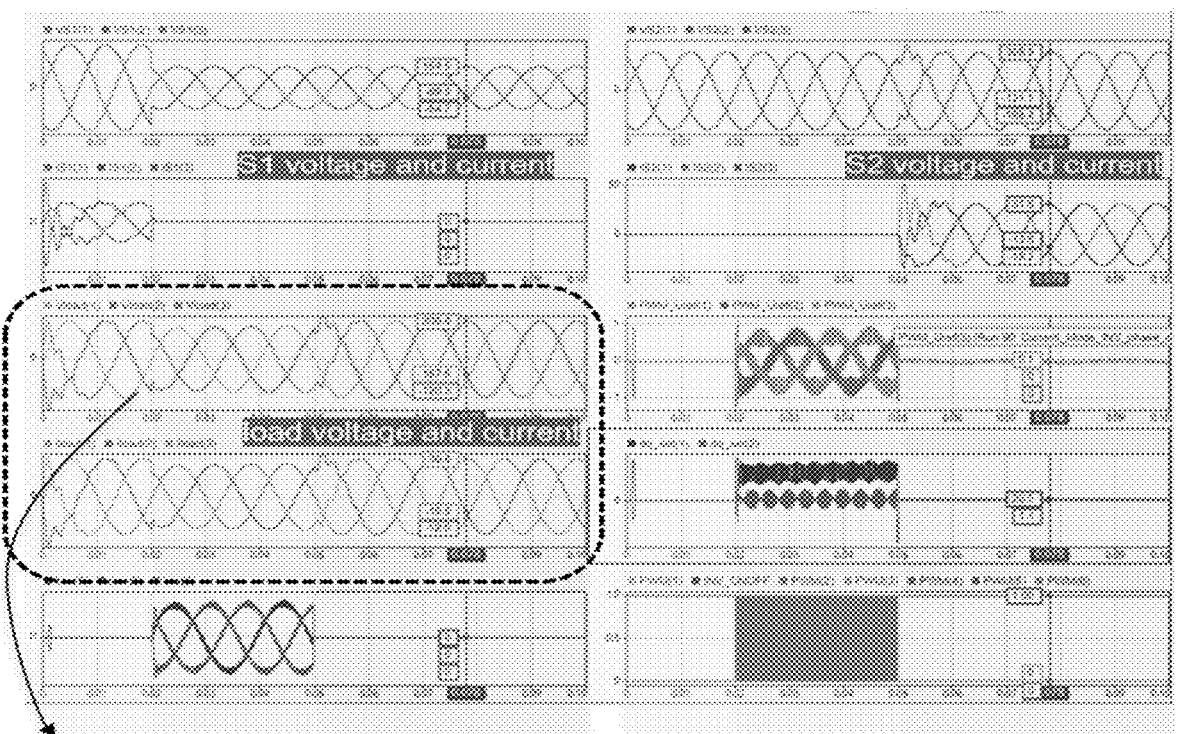
FIG. 14 is a graph of simulation results of a SSATS according to embodiments of the present disclosure.

FIG. 13 is a schematic diagram of timing of simulation of a SSATS according to embodiments of the present disclosure, and FIG. 14 is a graph of results of the simulation of a SSATS according to embodiments of the present disclosure. The SSATSes in FIGS. 13 and 14 may correspond to the SSATS in FIG. 2.

As shown in FIG. 13, t0 indicates a time point when the S1 fails (such as voltage sag), t1 indicates a time point when the S1 fails, the drive of the bridge arm of the SCR1 is turned off, and the PSU supplies power to the load. t2 indicates the time point when the CTR1 is turned off, and t3 indicates the time point when the CTR2 is turned on, and t4 indicates the time point when the phase synchronization between the PSU and the S2 is completed. The period from t0 to t1 is less than 1 ms, the period from t1 to t2 is less than 1 ms, the period from t2 to t3 is in the range of 50 ms to 200 ms, and the period from t1 to t4 (i.e. the entire period from detecting the S1 fails to directly supplying power to the load by the S2) may be less than 1 s.

As shown in FIG. 14, the left half of FIG. 14 shows the changes in voltage and current of the S1 over time, the right half of FIG. 14 shows the changes in voltage and current of the S2 over time, and in the dashed box of FIG. 14, it shows the changes in voltage and current of the load over time. In the first and second graphs from top to bottom in the left half of FIG. 14, there is an abnormal fluctuation in the current of the S1 at the beginning. At about 20 ms (0.02), the failure of the S1 is detected, and the PSU is changed to supply power to the load, so that the output current of the S1 is zero, and the S1 could be turned off. In the first graph from top to bottom in the right half of FIG. 14, at about 50 ms (0.05), the S2 directly supplies power to the load.

Referring to the graph in the dashed line section, the load is only affected by voltage sag within about 3 ms after 20 ms, and the power supply to the load is not interrupted throughout the entire process. Therefore, compared to the existing ATS and UPS architectures, the SSATS of the present disclosure can provide advantages such as fast switching, zero interruption, and short voltage sag time. In addition, compared to the UPS, the SCR has lower losses, eliminates the need for periodic battery replacement, and the configuration of the SCR and the PSU may avoid the effect of switch arcing.

The text and accompanying drawings are provided as examples only to assist in understanding the present disclosure. They should not be interpreted as limiting the scope of the present disclosure in any way. Although certain embodiments and examples have been provided, based on the content disclosed herein, it is apparent to those skilled in the art that changes may be made to the illustrated embodiments and examples without departing from the scope of the present disclosure.

Although the present disclosure has been described with exemplary embodiments, various changes and modifications may be suggested to those skilled in the art. The purpose of the present disclosure is to cover such changes and modifications that fall within the scope of the attached claims.

Any description in the present disclosure should not be understood as implying that any specific element, step, or function is a necessary element that must be included within the scope of the claims. The scope of the application subject is limited only by the claims.

What is claimed is:

1. A dual power transfer switch for supplying uninterrupted power to a load, comprising:
   a first solid-state switch configured to selectively connect the load to a first AC power supply providing AC electrical power of a first phase;
   a second solid-state switch configured to selectively connect the load to a second AC power supply providing AC electrical power of a second phase;
   a first mechanical switch in series with the first solid-state switch;
   a second mechanical switch in series with the second solid-state switch; and
   a power supply unit configured to selectively receive AC electrical power from a selected one of the first and second power supplies, and to provide AC electrical power of a controlled phase to the load, wherein, during normal operation, the second solid-state switch is open and the first solid-state switch is closed, thereby connecting the load to the first power supply;
   a controller configured to:
      cause the power supply unit to receive AC electrical power of the second phase from the second power supply and to convert the AC electrical power of the second phase received therefrom to AC electrical power of the first phase;
      monitor the first power supply to detect a failure of the first power supply; and
      in response to detecting the failure of the first power supply:
         cause the first solid-state switch to open, thereby isolating the load from the first power supply;
         cause the power supply unit to provide the AC electrical power of the first phase to the load;
         cause the first mechanical switch to open and the second mechanical switch to close after causing the first solid-state switch to open;
         cause the power supply unit to transition the controlled phase of the AC electrical power provided to the load from the first phase to the second phase; and
         cause the second solid-state switch to close in response to the controlled phase of the AC electrical power provided by the power supply unit being synchronized with the second phase of the AC electrical power received from the second power supply, thereby connecting the load to the second power supply.

2. The dual power transfer switch of claim 1, wherein the controller causes the first solid-state switch to open in response to AC electrical current provided by the first power supply falling below a first current threshold.

3. The dual power transfer switch of claim 1, wherein the controller causes the first solid-state switch to open in response to AC electrical voltage provided by the power supply unit exceeding a predetermined voltage threshold.

4. The dual power transfer switch of claim 1, wherein the controller causes the first solid-state switch to open in response to AC electrical current provided by the power supply unit exceeding a predetermined current threshold.

5. The dual power transfer switch of claim 1, wherein the controller is further configured, in response to detecting the failure of the first power supply, to:
   cause the power supply unit to receive AC electrical power of the first phase from the first power supply and to convert the AC electrical power of the first phase received therefrom to AC electrical power of the second phase.

6. The dual power transfer switch of claim 1, wherein the controller is further configured to cause the second mechanical switch to close before causing the second solid-state switch to close.

7. The dual power transfer switch of claim 1, wherein the first and second mechanical switches are configured as a single-pole double-throw switch.

8. The dual power transfer switch of claim 7, wherein the second solid-state switch is closed after the first solid-state switch is opened.

9. The dual power transfer switch of claim 1, further comprising:
   a third mechanical switch configured to selectively connect the first power supply to an input of the power supply unit; and
   a fourth mechanical switch configured to selectively connect the second power supply to the input of the power supply unit.

10. The dual power transfer switch of claim 9, wherein the third and fourth mechanical switches are configured as a single-pole double-throw switch.

11. The dual power transfer switch of claim 1, wherein the power supply unit comprises:
   a first AC to DC converter configured to convert the AC electrical power selectively received from the first power supply to DC electrical power;
   a second AC to DC converter configured to convert the AC electrical power selectively received from the second power supply to DC electrical power; and
   a three-phase inverter unit configured to receive the DC electrical power from the first and second AC to DC converters and to generate therefrom the AC electrical power of the controlled phase.

12. The dual power transfer switch of claim 1, wherein the first solid-state switch has three bridge arms, each configured to receive a corresponding phase of three-phase AC electrical power of the first phase provided by the first power supply, the second solid-state switch has three bridge arms, each configured to receive a corresponding phase of three-phase AC electrical power of the second phase provided by the second power supply, and the power supply unit is a three-phase power supply unit configured to generate three-phase AC electrical power of the controlled phase.

13. The dual power transfer switch of claim 12, wherein the power supply unit comprises:
   an AC to DC converter configured to convert the AC electrical power selectively received from the first or second power supplies to DC electrical power; and
   a three-phase inverter unit configured to receive the DC electrical power from the AC to DC converter and to generate therefrom the AC electrical power of the controlled phase.

14. The dual power transfer switch of claim 13, wherein the AC to DC converter comprises a high-frequency transformer.

15. The dual power transfer switch of claim 13, wherein the AC to DC converter comprises a power frequency transformer.

16. The dual power transfer switch of claim 1, wherein each of the first and second solid-state switches comprises a bidirectional switch array, wherein the bidirectional switch array is formed through a thyristor, a metal oxide semiconductor field effect transistor (MOSFET), or an insulated gate bipolar transistor (IGBT).

17. The dual power transfer switch of claim 16, wherein the bidirectional switch array comprises a reverse parallel pair of thyristors, or MOSFETs, or IGBT transistors.

18. The dual power transfer switch of claim 1, wherein the controller is further configured, in response to detecting the failure of the first power supply, to:

cause the power supply unit to provide the AC electrical power of the first phase to the load before causing the first solid-state switch to open, thereby temporarily providing the AC electrical power of the first phase to the load from both the first power supply and the power supply unit.

* * * * *